United States Patent

[11] 3,559,976

[72] Inventor Joseph Jerz, Jr.
131 Wylerhorn St., Crestline, Calif. 92325
[21] Appl. No. 768,249
[22] Filed Oct. 17, 1968
[45] Patented Feb. 2, 1971

[54] VARIABLE STIFFNESS SUSPENSION SYSTEM
17 Claims, 6 Drawing Figs.
[52] U.S. Cl..................................................... 267/61,
267/1
[51] Int. Cl....................................................... F16f 1/12
[50] Field of Search........................................ 267/60, 61,
168

[56] References Cited
UNITED STATES PATENTS
2,301,742  11/1942  Muller........................... 267/60
FOREIGN PATENTS
618,602  2/1949  Great Britain................. 267/1(68)

Primary Examiner—James B. Marbert
Attorney—William P. Green

ABSTRACT: A vehicle suspension system including two springs connected in series, with one of the springs being stiffer than the other, and with the springs being so related that under normal load conditions the softer of the two springs is effective to provide a very gently cushioned ride, while upon the imposition of heavier load forces, the vehicle is supported more stiffly and primarily by the stronger spring. The conversion between these two conditions may be effected automatically, by engagement under heavy load conditions of a pair of stop shoulders acting to limit compression of the light spring. Similarly, upon excessive extension of the springs, an additional set of stop shoulders may automatically become effective to limit the amount of extension of the softer spring and cause the stiffer spring to resist further extension. A shock absorber may be utilized in conjunction with the springs, and may itself carry or include one or more of the stop shoulders.

JOSEPH JERZ, JR.
INVENTOR.

BY William P. Green
ATTORNEY

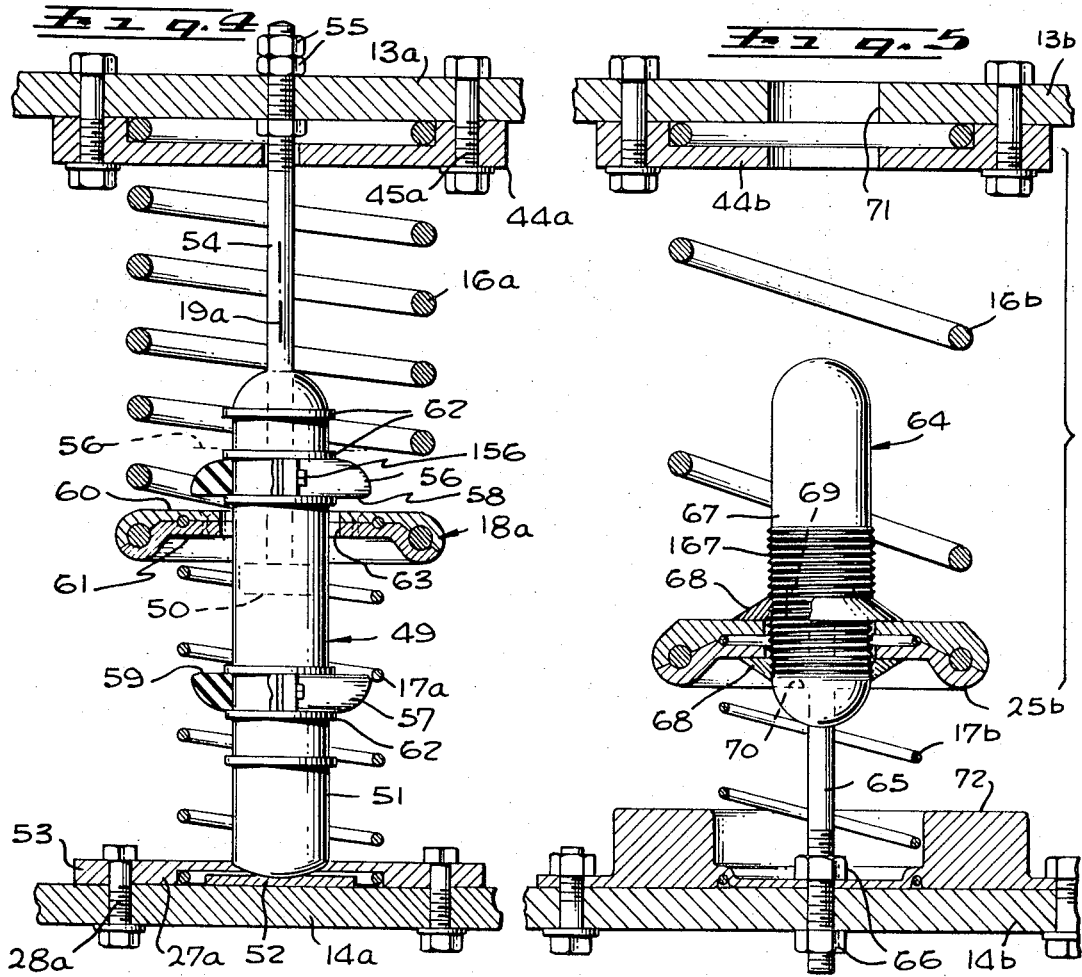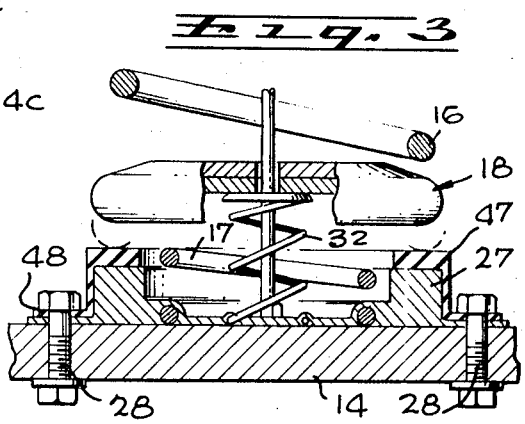

3,559,976

1

VARIABLE STIFFNESS SUSPENSION SYSTEM

CROSS REFERENCE TO RELATED APPLICATION

Certain features of the present invention are similar to the arrangements shown in my copending application entitled "Overload Spring Structure," Ser. No. 768345, filed of even date herewith.

BACKGROUND OF THE INVENTION

This invention relates to suspension systems for automobiles and other types of vehicles.

Most conventional suspension systems have the disadvantage that they can not function well under varying load conditions. If the suspension is designed for use with a light load in the vehicle, an excessive weight will usually cause the vehicle to ride very low relative to the wheels, with an ineffective springing action; whereas if the suspension is designed for use with a heavy load, the ride may be unnecessarily stiff and unpleasant under light load conditions. This latter condition is produced, for example, when overload springs are installed in addition to the conventional suspension system, since these overload springs merely serve to supplement the supporting force of the main spring system in a manner stiffening the ride both in heavy load and light load conditions.

SUMMARY OF THE INVENTION

The present invention provides a unique type of suspension system which is capable of producing a very soft and well cushioned ride under light load conditions, but which automatically converts to a stiffer condition when the vehicle is more heavily loaded. Further, the system may be arranged to afford adjustment of the point at which the system converts from its soft ride to its stiff ride condition, or to introduce an intermediate stage acting to decrease the abruptness of conversion between these two conditions. Additionally, certain forms of the present invention incorporate in the system a shock absorber, which resists unwanted oscillation of the spring structure, and may itself carry means for effecting conversion of the system between its two conditions.

Structurally, a system embodying the invention includes a coil spring structure having two portions which are connected together in series in load supporting relation, with one of these portions being relatively stiff and the other portion being relatively soft. The opposite ends of this spring system exert force in opposite vertical directions against the sprung and unsprung masses respectively of the vehicle. A stop shoulder is carried by the spring structure at essentially the juncture of its stiff and soft portions, and is engageable with another stop shoulder, after predetermined deformation of the soft spring portion, in a relation resisting further deformation of that portion and rendering the stiff spring portion thereafter effective as the primary spring element. Thus, the interengagement of the stop shoulders converts the spring system a soft spring condition to a stiff spring condition upon imposition of excessive load forces. Similarly, in an extending direction, stop shoulders act to limit extension of the soft spring portion at a predetermined condition, so that further extension is resisted primarily or entirely by the stiff spring portion, to thereby prevent excessive separation of the sprung and unsprung masses.

Preferably, the two spring portions are formed as coil springs, and have a shock absorber located within their interior. In one form of the invention, this shock absorber carries two of the mentioned stop shoulders about its periphery, for engagement by a spring-carried third should shoulder a relation limiting both upward and downward deformation of the soft spring. In another form of the invention, the shock absorber is so connected to the springs that the piston and cylinder of the shock absorber itself function as the stop elements.

2

BRIEF DESCRIPTION OF THE DRAWING

The above and other features and objects of the invention will be better understood from the following detailed description of the typical embodiments illustrated in the accompanying drawings, in which:

FIG. 3 is a reduced scale fragmentary representation of a variational form of the invention; and FIGS. 4, 5 and 6 are views similar to FIG. 2, but showing other variational arrangements.

DESCRIPTION OF THE PREFERRED EMBODIMENTS

Figure 1:
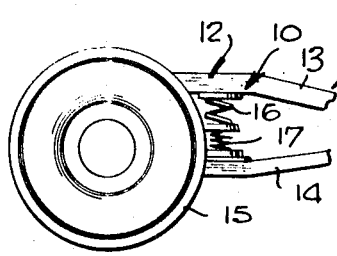
FIG. 1 is a fragmentary somewhat diagrammatic representation of one manner in which a suspension assembly constructed in accordance with the invention can be utilized in a motor vehicle.

Referring first to FIG. 1, I have represented generally at 10 a first form of coil spring suspension assembly constructed in accordance with the invention, as it appears when utilized as the main suspension for a motor vehicle fragmentarily represented at 11. The main frame of the vehicle is illustrated fragmentarily at 12, and includes typically a frame member 13 extending in a front to rear direction, and supported, with the remainder of the sprung mass of the vehicle, by the upper end of suspension assembly 10. The illustrated wheel 15 is mounted rotatably to the unsprung mass including a rigid member 14 extending in a front to rear direction beneath upper member 13. As will be understood, one of the assemblies 10 is provided at each of the four wheels of the vehicle, with the structures of the sprung and unsprung masses at each location taking whatever form may be desirable in the particular vehicle being suspended, and with the structure of these masses of course being vastly different for front wheel suspensions than for rear wheel suspensions, and being different for independent rear wheel suspensions than for fixed axle arrangements.

Figure 2:
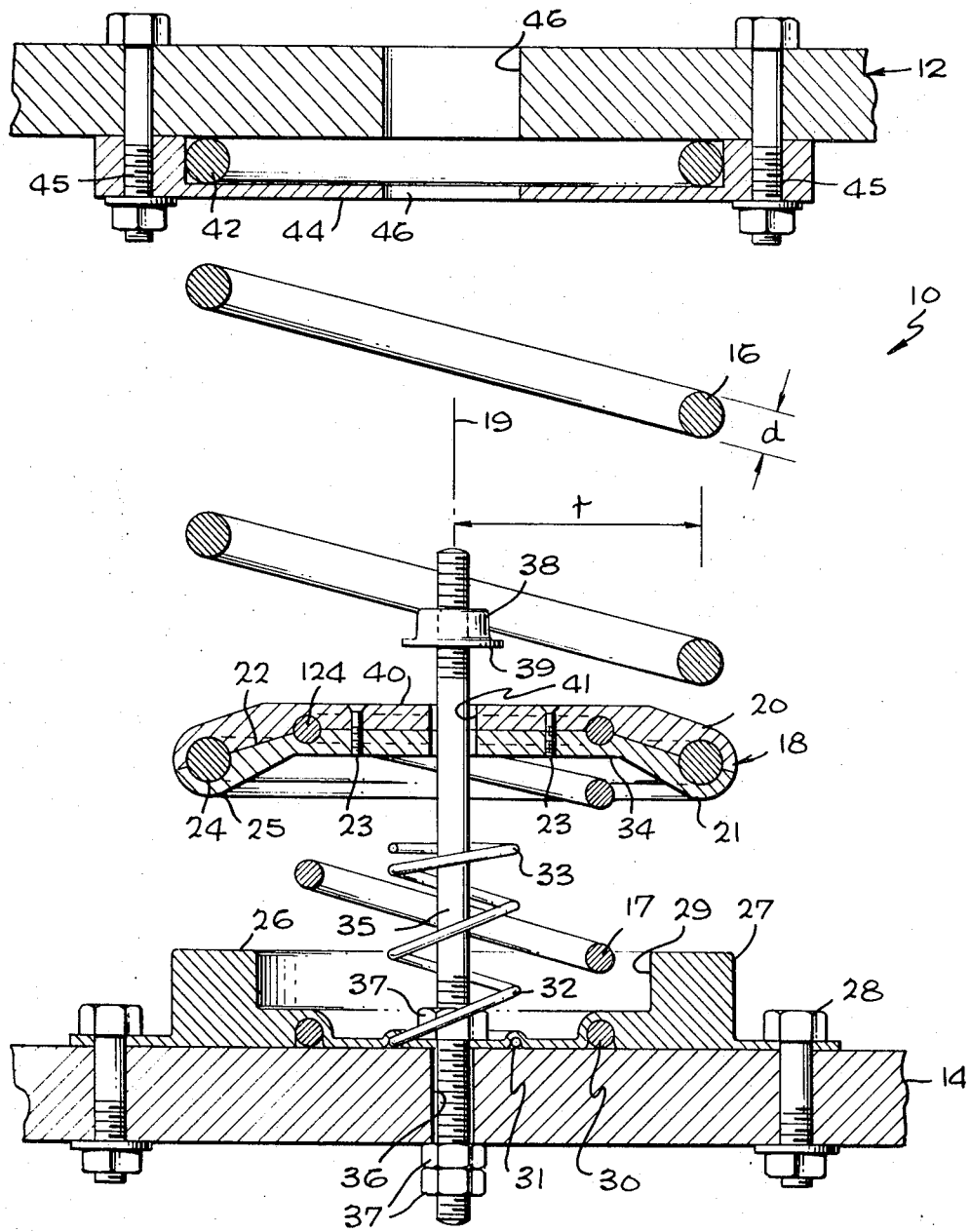
FIG. 2 is a greatly enlarged vertical section through the suspension of FIG. 1.

The structural details of suspension assembly 10 of FIG. 1 are illustrated in FIG. 2. As seen in the latter FIG., assembly 10 includes to two coil springs 16 and 17 which are connected together in series between the unsprung mass 14 and the sprung mass 13 in resilient supporting relation. It is contemplated that these coil springs 16 and 17 may if desired be formed as portions of a single continuous spring element, but they are preferably formed separately and connected together in series by a rigid clamp structure 18. Both of the coil springs 16 and 17 are centered about a common vertical axis 19. Upper spring 16 is designed to be substantially stiffer than lower spring 17, that is, to have a substantially higher 'spring rate,' so that spring 17 will compress axially much more rapidly than spring 16 upon the imposition of the same axial compressive force. Desirably, spring 16 is formed of a wire of greater diameter ($d$ in FIG. 2) than that used in forming spring 17, and also has its coils formed at a greater radius ($r$ in FIG. 2) with respect to axis 19 than is used in spring 17. Clamp 18 may typically be formed of two annular disclike complementary halves 20 and 21, centered about axis 19 and meeting or approximately meeting at the separation area 22, with these two halves being suitably secured together as by screws 23. A lower annular turn 24 of spring 16, disposed essentially within a plane extending transversely of axis 19, is clamped and retained tightly between the two halves 20 and 21 of clamp 18, with a suitable opening being provided through the upper half 20 for spring 16 to extend upwardly at one location. Similarly, an upper transverse annular turn 124 of lower spring 17 is tightly and rigidly gripped between the two halves of clamp 18, to in effect rigidly connect the upper tend of spring 17 and the lower end of spring 16 together for movement upwardly and downwardly in unison. The annular peripheral portion of clamp 18 may extend angularly downwardly as shown in FIG. 2, at a location radially or horizontally beyond the outer extremity of reduced diameter lower spring 17, to provide an annular downwardly facing shoulder surface 25 at the underside of the periphery of the clamp for engagement with the annular upwardly facing shoulder surface 26 formed on a stop member 27 attached to unsprung element 14. Member 27 may be a rigid metal part, extending annularly about axis 19, and secured rigidly to member 14 by screws represented at 28. Radially inwardly of its horizontal annular upwardly facing stop shoulder surface 26, element 27 may contain an essentially annular recess 29 for receiving a lower transverse horizontal turn 30 of spring 17, to tightly clamp and retain the lower end of that spring in the illustrated fixed position with respect to the unsprung member 14. Similarly, member 27 may clamp downwardly against member 14, and rigidly retain, the lower turn 31 of a small diameter third coil spring 32, which is centered about 19 and has a top horizontal turn 33 extending transversely of axis 19. In the FIG. 2 normal condition of spring 32, the upper substantially annular surface of its top turn 33 is disposed above the plane of stop surface 26 of element 27, but beneath the planar horizontal undersurface 34 of clamp 18. Spring 32 preferably has a spring rate which is lower than that of both of the springs 16 and 17, and which renders spring 32 still softer than the spring 17.

Extending upwardly within the interior of all of the springs, and along axis 19, there is provided a vertical rigid bolt or rod 35, which is secured rigidly in fixed position relative to the unsprung member 14 by extension downwardly through an opening 36 in that member, and through a registering opening in member 27, with nuts 37 being threaded onto bolt 35 at the upper side and underside the members 27 and 14 to lock the bolt in position. Near it upper end, the bolt threadedly carries a nut 38, having a horizontal undersurface 39 which is engageable with the horizontal upper surface 40 of clamp 18 to limit upward movement of the clamp relative to the bolt. Nut 38 may be a lock nut, which is capable of permanently remaining by its own friction in any set position along bolt 35, and yet which can be forcibly adjusted relative to the bolt to alter the upward stop position, as will be discussed at the later point. Clamp 18 contains central vertically extending opening 41, through which bolt 35 extends, with this opening being of a diameter small enough to enable annular engagement of the nut 38 with the clamp about the opening.

The upper end of top spring 16 rigidly secured to the sprung mass 13 by tight retention of a transverse annular top turn 42 of spring 16 between member 13 and an annular element 44 secured to element 13 by bolts 45. To pass bolt 35 and nut 38 upwardly upon compression of the springs, members 13 and 44 may contain openings 46 centered about axis 19.

To now describe the manner of operation of the suspension system illustrated in FIGS. 1 and 2, assume that in normally supporting the weight of the vehicle the springs 16 and 17 are in the FIG. 2 condition, in which the lower relatively soft or weak spring 17 is free to compress downwardly and return upwardly, to thus very softly and smoothly cushion the suspension of the upper sprung mass 12—13 relative to the unsprung mass 14. Under these standard load conditions, the much stiffer upper spring 16 will deform very little as compared with lower spring 17. If now load applied to the sprung mass 12 is increased drastically, or if an irregularity in the road or other driving condition is encountered which tends to move the sprung mass excessively downwardly relative to the unsprung mass 14, the undersurface 25 of clamp 18 will ultimately come into engagement with the upper surface 26 of stop element 27, to positively resist and prevent further downward movement of clamp 18 and the connected ends of springs 16 and 17, and to thereby prevent further compression of lower soft spring 17. Since the spring 17 can no longer compress, any further downward movement of sprung mass 12—13 is resisted by the full strength of relatively stiff spring 16, to thereby provide a greatly increased load supporting force, and enable effective support of a very heavy load in the vehicle. Thus the ride attained by the overall assembly is very soft under normal low load conditions, but automatically becomes stiffer when heavier loads are encountered.

Preferably, the light spring 17 never compresses completely even in the heavy load condition. That is, even when shoulders 25 and 26 are in engagement, the successive turns of spring 17 are desirably not in contact with one another, but are still spaced axially apart, and would allow further compression of the spring except for the limitation provided by he by the stop shoulders.

The auxiliary spring 32 may or may not be provided in the system. If it is provided, it is so dimensioned as to engage the undersurface 34 of clamp 18 just prior to contact of stop shoulder 25 with shoulder 26, to thereby add the compressive resistance of spring 32 to that of spring 17 in a manner providing an intermediate stage in which the combined resistance of springs 17 and 32 is somewhat greater than that of spring 17 alone, but is not as great as the resistance offered by spring 16 after it becomes the sole effective spring, upon engagement of stop shoulder 25 and 26. Thus, spring 32 cushions the shift from the light spring to the heavy spring condition.

If bumps are encountered which tend to pull the top sprung frame element 13 upwardly relative to and away from bottom member 14 to an excessive extent, the upper surface of clamp 18 engages the underside of the nut or enlargement 38 on bolt 35, to prevent further upward extension of soft spring 17, and thereafter resist additional upward movement of member 13 relative to member 14 by the full strength of spring 16. This feature is of great importance in preventing excessive upward rebound of the sprung mass, and also in limiting the extent to which the wheels of an independent suspension type vehicle may swing downwardly when the vehicle is on a grease rack or the like.

FIG. 3 shows a slight variation of the FIG. 2 arrangement, in which a shim 47 (or several shims) may be provided at the upper side of stop element 27, to raise the level at which downward movement of clamp 18 is halted by engagement of the clamp with the upper surface of the shim. The shim may be secured to member 14 by extension of the previously mentioned screws 28 through a flange 48 in the shim. The shim may be formed of a rigid material, such as a metal, or preferably in many instances is formed of a resiliently deformable material, such as rubber, which is adapted to compress slightly when contacted by clamp 18, to thereby cushion the engagement of the stop shoulders, either in conjunction with or in substitution for the cushioning effect of auxiliary spring 32. Desirably, shim 47, if resilient, is stiffer than either of the springs 17 or 32, but for best results not as stiff as spring 16. If both spring 32 and a resilient shim 47 are provided, the entire suspension assembly will provide four successive cushioning stages, as follows:

1. The discussed first stage in which spring 17 is the main cushioning element.
2. A slightly stiffer second stage (full line position of FIG. 3) in which the force of spring 32 is added to that of spring 17.
3. The broken line position of FIG. 3 in which the resistance of shim 47 is added to that of the other springs.
4. A final stage in which shim 47 has been compressed as far as it will compress, and the full force of spring 16 supports the sprung mass.

With reference now to the form of the invention shown in FIG. 4, the arrangement there illustrated is very similar to that of FIG. 2, except for the addition of a shock absorber assembly 49 extending vertically within the interior of the coil spring assembly along vertical axis 19a. The spring assembly includes a first upper stiff spring 16a and a lower relatively soft spring 17a, having their adjacent ends connected together rigidly by a clamp 18a, and with the upper end of spring 16a being secured rigidly to sprung mass 13a by an annular retaining element 44a secured by screws 45a, while the lower end of bottom spring 17a is secured rigidly to the unsprung wheel carrying mass 14a by an annular retaining element 27a retained by screws 28a.

Shock absorber 49 may internally be of any conventional construction, preferably being of the double acting type in which fluid resistance is offered to movement of its piston 50 both upwardly and downwardly relative to the cylinder 51 of the shock absorber. The shock absorber is connected between masses 13a and 14a, in parallel with the entire two stage spring assembly 16a-17a. For this purpose, the cylinder 51 of the shock absorber may rigidly carry at its lower end an enlarged diameter annular flange 52, which is received and confined beneath a rigid flange 53 of retaining element 27a, to retain the cylinder against movement in any direction relative to unsprung mass 14a. The upper end of the piston rod 54 of the shock absorber may be rigidly connected to sprung mass 13a, by extension through an opening in that mass and in retaining element 44a, and by provision of lock nuts 55 threaded onto the piston rod above and beneath the sprung mass.

Externally, cylinder 51 of the shock absorber carries two annular stop elements 56 and 57, having transverse horizontal stop shoulder surfaces 58 and 59 which are engageable in abutting relation with the upper and lower horizontal transverse surfaces 60 and 61 formed at the top and bottom of clamp 18a, to limit both the upward and downward movement of the clamp relative to cylinder 51. These stop elements 56 and 57 may be retained between appropriate annular locating flanges 62 formed on the outside of the cylinder, with the stop elements preferably being of a structure adapted to be removed from between any selected pair of the flanges 62 and positioned between another pair, to thus adjust axially the position of the stop shoulders 58 and 59. For this purpose, each of the elements 56 and 57 may be formed of two or more semicircular or arcuate segments, secured together by screws or other fasteners 156, but adapted to be separated sufficiently by loosening of the fasteners to enable shifting of the elements 56 and 57 to new positions (as to the broken line position of upper stop element 56 in FIG. 4). A circular opening 63 within the clamp 18a may be of a diameter just sufficient to pass the flanges 62 of the cylinder, but small enough to enable engagement of surfaces 60 and 61 with stop elements 56 and 57. The stop elements may be formed of a suitable rigid material, such as metal, or may be formed of a slightly deformable elastomeric material such as rubber or a plastic.

In using the arrangement of FIG. 4, the functioning of the coil spring is the same as in FIG. 2, except that stop elements 56 and 57 take the place of the stop shoulder surfaces 39 and 26 respectively. Thus, when clamp 18a is in its FIG. 3 normal load position, lower soft spring 17a is free to compress upon the imposition of downward forces, so that a soft ride is provided for the vehicle. When, however, the load becomes great enough to cause clamp 18a to move downwardly into engagement with stop element 57, that stop element prevents further downward movement of the clamp and the connected ends of the two springs 16a and 17a, so that thereafter only the upper relatively stiff spring 16a can be compressed, to thus provide the heavy supporting forces required for the overload condition. In instances in which contact with a bump in the road, or another driving condition, causes a tendency for excessive vertical separation of the two masses 13a and 14a, clamp 18a moves upwardly into engagement with shoulder surface 58, to prevent further extension of lower soft spring 17a, so that any further extension is resisted by the full force of stiff spring 16a, to thus prevent excessive separation of the two sprung and unsprung masses.

The FIG. 5 variation may be considered the same as that of FIG. 2, except for the deletion of auxiliary spring 32 and bolt 35, and the addition in FIG. 5 of a preferably double acting shock absorber 64, which in this instance is connected in parallel with only the lower relatively soft spring 17b, and not the upper stiffer spring 16b. More particularly, the piston rod 65 of shock absorber 64 is connected rigidly by nuts 66 to the unsprung mass 14b, while the cylinder 67 of the shock absorber is connected by elements 68 to the clamp 18b which secures together the ends of the two springs. Elements 68 may be of any type capable of securing the clamp 18b rigidly to the cylinder of the shock absorber, but preferably in a manner enabling adjustment of the clamp vertically relative thereto, typically by provision on the outside of cylinder 67 of threads 167 onto which elements 68 are threadedly connected for vertical adjustment, with clamp 18b being received and clamped tightly between these two elements in any adjusted position. Alternatively, different sets of the retaining elements 68 may be provided at different locations on the cylinder (as in the case of flanges 62 of FIG. 4), with the clamp 18b being designed for selective retention between any of those different sets of retaining elements. The piston 69 within cylinder 67 of the shock absorber of course has a limited range of travel, within the cylinder, and in its lowermost position, relative to the cylinder, is engageable with a shoulder 70, which functions as the stop shoulder for limiting extension of spring 17b. In the maximum compression condition of the springs, the upper end of the shock absorber may extend through appropriate openings 71 formed in the upper sprung mass 13b and spring retaining element 44b.

In use of the FIG. 5 arrangement, lower spring 17b normally provides a relatively soft ride for the vehicle, under low load conditions, and until the weight of the vehicle reaches a state in which clamp 18b engages downwardly against stop shoulder 72, to convert the apparatus to the overload condition in which upper stiff spring 16b is effective as the supporting element. The compression of lower spring 17b is smoothed out or 'snubbed' by shock absorber 64, which is connected in parallel to the spring. As in the other forms of the invention, lower spring 17b preferably never reaches a fully compressed condition, even when its compression is halted by engagement of stop shoulders 25b and 72. When the sprung and unsprung masses 13b and 14b tend to move vertically too far apart, engagement of piston 69 within the shock absorber with shoulder 70 limits the extension of soft spring 17b, so that further separation of masses 13b and 14b is resisted by the full force of stiffer spring 16b, to thereby attain the result of the extension limiting shoulders in the other forms of the invention.

The FIG. 6 apparatus is similar to that of FIG. 1, except that the extension of lower soft spring 17c is halted by two or more generally hook-shaped stop elements 76 at the outside of the springs, these elements 76 having horizontal downwardly facing stop shoulder surfaces 77 engageable with an upwardly facing annular stop surface 78 on clamp 18c. Downward movement of clamp 18c is halted by engagement with a stop shoulder element 27c corresponding to part 27 of FIG. 2, or an intermediate or superimposed shim 47c corresponding to shim 47 of FIG. 3. Openings 46c in sprung mass 13c and part 44c may be provided for reception of stop elements 76 in the fully compressed condition of the apparatus, with part 44c being secured to part 13c by bolts 45c within the interior of upper spring 16c.

The functioning of the FIG. 6 arrangement will be apparent from the description of the other forms, since clamp 18c is free for unrestrained movement downwardly under normal loading conditions (the FIG. 6 position of the clamp), but with downward compression of spring 17c being limited by engagement of the clamp with stop 27c or shim 47c, and with upward extension of the same spring being limited by engagement with stop shoulder surfaces 77.

I claim:

1. In a vehicle suspension system having a wheeled first member and a second member mounted for relative upward and downward movement, the combination comprising a spring structure interposed operatively between said two members to resiliently support said second member from the first member, said structure having two coil spring portions connected in series and in compression between said members with first ends of the two portions exerting load supporting force oppositely against said two members respectively and with intermediate second ends exerting force against one another in load transmitting relation, one of said coil spring portions being relatively soft and the other relatively stiff so that upon application of a load force said soft portion will initially compress more rapidly than the stiff portion, means forming first and second shoulders facing essentially in opposite axial directions and operatively connected essentially to said second ends of said two spring portions for movement therewith, a third shoulder engageable by said first shoulder in a relation resisting further compression of said soft spring portion after predetermined initial compression thereof so that further downward movement of said second member is resisted primarily by the strength of said stiff portion, and a fourth shoulder acting upon predetermined upward movement of said second member relative to said first member to engage and block movement of said second shoulder in a relation causing further upward movement of said second member to be resisted by the strength of said stiff spring portion independently.

2. The combination as recited in claim 1, in which one of said first and third shoulders has resilience to allow some continued deformation of the soft spring portion after engagement of the first and third shoulders but with increased resistance.

3. The combination as recited in claim 1, in which said two spring portions are formed separately, there being a connector structure securing said second ends of the spring portions together and forming said first and second shoulders.

4. The combination as recited in claim 1, including a unit connected to said second ends of the spring portions and containing an opening and carrying said second shoulder, and an elongated member connected to one of said members and projecting through said opening and having an enlargement forming said fourth shoulder for engaging said second shoulder on said unit.

5. The combination as recited in claim 1, including an additional spring positioned to commence resisting movement of said second ends and compression of said soft spring portion after some movement of said second ends but prior to engagement of said first and third shoulders.

6. The combination as recited in claim 1, including a unit connected to said second ends of the spring portions and containing an opening and carrying said first and second shoulders, an elongated member connected to one of said members and projecting through said opening and having an enlargement forming said fourth shoulder for engaging said second shoulder on said unit, and an additional coil spring disposed about said elongated member and engageable by said unit to commence resisting movement of said second ends and compression of said soft spring portion after some movement of said second ends but prior to engagement of said first and third shoulders.

7. The combination as recited in claim 6, in which the engagement between said first and third shoulders has some resilience but is stiffer than said soft spring portion or said additional spring.

8. The combination as recited in claim 1, including a shock s absorber extending generally vertically within said coil spring portions and resisting relative vertical movement of said first and second members, said third and fourth shoulders being carried by said shock absorber.

9. The combination as recited in claim 1, in which said third shoulder is a structure connected to said first member essentially about said soft spring portion.

10. The combination as recited in claim 9, including an essentially annular removable shim connectable to said third shoulder about said soft spring portion to change the point at which said shoulders become effective.

11. The combination as recited in claim 1, including means for adjusting the effective position of one of said shoulders to thereby alter the point at which two of said shoulders engage.

12. In a vehicle suspension system having a wheeled first member and a second member mounted for relative upward and downward movement, the combination comprising a spring structure interposed operatively between said two members to resiliently support said second member from the first member, said structure having two coil spring portions connected in series between said members with first ends of the two portions exerting load supporting force oppositely against said two members respectively and with intermediate second ends exerting force against one another in load transmitting relation, one of said coil spring portions being relatively soft and the other relatively stiff so that upon application of a load force said soft portion will initially deform more rapidly than the stiff portion, and a shock absorber connected in parallel with said soft spring portion but not said stiff spring portion.

13. The combination as recited in claim 12, including means forming a first shoulder operatively connected essentially to said second ends of said two spring portions for movement therewith, and a coacting additional shoulder engageable by said first shoulder in a relation resisting further deformation of said soft spring portion after predetermined initial deformation thereof so that further downward movement of said second member is resisted primarily by the strength of said stiff portion.

14. In a vehicle having a wheeled first member and a second member mounted for relative upward and downward movement, the combination comprising spring means which in at least one condition thereof are interposed operatively between said two members to resiliently support said second member from the first member, said spring means having two coil spring portions which in said one condition are interposed in series between the members, one of said portions being relatively soft and the other relatively stiff, said spring portions being under compression in said one condition thereof, said stiff spring portion being returnable to an uncompressed and under undeformed condition upon predetermined upward movement of said second member relative to said first member, and being deformable beyond said uncompressed and undeformed condition to an axially extended condition in which it yieldingly resists further relative upward movement of said second member, means connecting a first end of said stiff spring portion to one of said members in a relation to exert a yielding force thereagainst for resisting said further relative upward movement of the second member, means forming a stop shoulder operatively connected to said stiff portion near a second end thereof, and a coacting second shoulder engageable by said first mentioned shoulder after predetermined relative separation of said members in a relation thereafter resisting separation of said members by the force of said extended stiff spring portion.

15. The combination as recited in claim 14, in which said connecting means connect the upper end of said stiff spring portion to said second member, said soft spring portion having its upper end connected to the lower end of said stiff portion and its lower end connected to said first member, said first mentioned stop shoulder being carried by the lower end of said stiff portion and the upper end of said soft portion, and said coacting shoulder being connected to said first member.

16. The combination as recited in claim 14, including a shock absorber within said spring portions and connected at opposite ends to said members respectively.

17. In a vehicle having a wheeled first member and a second member mounted for relative upward and downward movement, the combination comprising coil spring means which in at least one condition thereof are interposed operatively between said two members to resiliently support said second member from the first member, said spring means being under compression in said one condition thereof and having a coil spring portion returnable to an uncompressed and undeformed condition upon predetermined upward movement of said second member relative to said first member, said portion being deformable beyond said uncompressed and undeformed condition to an axially extended condition in which it yieldingly resists further relative upward movement of said second member, means connecting a first end of said spring portion to one of said members in a relation to exert a yielding force thereagainst for resisting said further relative upward movement of the second members, means forming a stop shoulder operatively connected to said spring portion near a second end thereof, and a coacting second shoulder engageable by said first mentioned shoulder after predetermined relative separation of said members in a relation thereafter resisting separation of said members by the force of said extended spring portion.